United States Patent Office 2,965,130
Patented Dec. 20, 1960

2,965,130

TRACTOR-TRAILER BRAKE SYSTEM

William Stelzer, Summit, N.J., assignor to Kelsey-Hayes Company, a corporation of Delaware Filed Feb. 15, 1956, Ser. No. 565,662

6 Claims. (Cl. 137—496)

This invention relates to a tractor-trailer brake system and more particularly to the combination in the system of a novel type of check valve for maintaining vacuum in the reservoirs on the trailer for operating the trailer brakes.

It is the common practice in tractor-trailer brake systems to provide air-suspended brake-applying motors on the trailer, adapted to be operated by vacuum in a reservoir under the control of a conversion valve which operates in accordance with the energization of the brake booster motor on the tractor. Such a system includes a source of vacuum on the tractor, a supply line connected from such source to the vacuum reservoir or reservoirs on the trailer, and check valve means in the supply line adapted to be closed to preserve the vacuum in the trailer reservoirs upon a drop of vacuum in the supply line or a rupturing of the supply line, depending upon whether an open or closed check valve system is employed, as referred to below. The conversion valves connected to the vacuum reservoirs are operated in accordance with pressures in a control line connected between the booster and the conversion valves so that the latter connect the reservoirs to the trailer brake operating motors to apply the trailer brakes to an extent proportional to energization of the booster motor.

Systems of the above character employ either of two types of check valves in the vacuum supply line, namely, a normally closed valve or a normally open power check valve. With the former type of check valve, the valve per se is biased to closed position and remains in such position whenever there is a fairly close balance in pressures at opposite sides of the check valve. Such valve functions to cut off the vacuum reservoirs from the source in the event a leak occurs in the line between the check valve and the source, or if the source fails to maintain a predetermined vacuum between it and the check valve.

In the other type of system, the check valve is normally open because of the use of a biasing spring for this purpose. In such type of check valve, therefore, a leakage in the line ahead of the check valve will not cause it to close, and the closing off of the line is dependent wholly upon a rupturing of the line and a consequent rush of air through the check valve.

Each type of check valve has its advantages, the normally closed valve serving to save vacuum in the trailer reservoirs. On the other hand, it is desirable to keep the supply line open through the check valve to maintain the same vacuum in the reservoir as in the control line under normal operating conditions, since an unbalance in pressure can cause an operation of the conversion valves to thereby cause the trailer brakes to drag.

An important object of the present invention is to provide a novel system having a power operable check valve of such construction that it functions to close off the supply line either upon a sudden rupturing thereof or upon a loss in pressure between the check valve and the vacuum source due to leakage or inefficient operation of the source to provide the desired degree of vacuum.

A further object is to provide such a system wherein under normal operating conditions the check valve is pressure biased to open position to maintain a direct connection between the vacuum source and the trailer reservoir, and wherein such pressure biasing means is rendered ineffective upon a certain drop in vacuum ahead of the check valve so as to result in the closing of the latter and the maintenance of proper vacuum in the reservoirs.

A further object is to provide a check valve of the type referred to wherein the check valve itself is subject to pressures on opposite sides thereof and is of such nature that a sudden rupturing of the supply line ahead of the check valve will result in the instant closing of the check valve to prevent loss of vacuum from the reservoir.

A further object is to provide such a check valve in a tractor-trailer brake system wherein the check valve is biased to closed position and is held in open position by pressure responsive means which is operative so long as proper vacuum is maintained in the supply line between the check valve and the vacuum source and wherein the pressure responsive means, upon a predetermined drop in vacuum ahead of the check valve, becomes ineffective for maintaining the check valve open whereupon the biasing means thereof closes the check valve.

A further object is to provide such a check valve which is readily subject to design and operable to close the supply line upon any predetermined drop in vacuum ahead of the check valve for any cause, whereby the check valve closes at the predetermined drop in vacuum for which it is designed but wherein under such conditions substantially balanced forces affect the biasing means and pressure responsive means so that any subsequent increase in vacuum ahead of the check valve will crack it to connect the trailer vacuum reervoir to the vacuum source.

A further object is to provide such a check valve wherein the check valve per se and associated parts are so designed as to make the check valve power-operable by a rush of air into the supply line ahead of the check valve incident to a rupututring of such line, to instantly close the check valve.

Other objects and advantages of the invention will become apparent during the course of the following description.

In the drawings I have shown one embodiment of the invention. In this showing:

Figure 1:
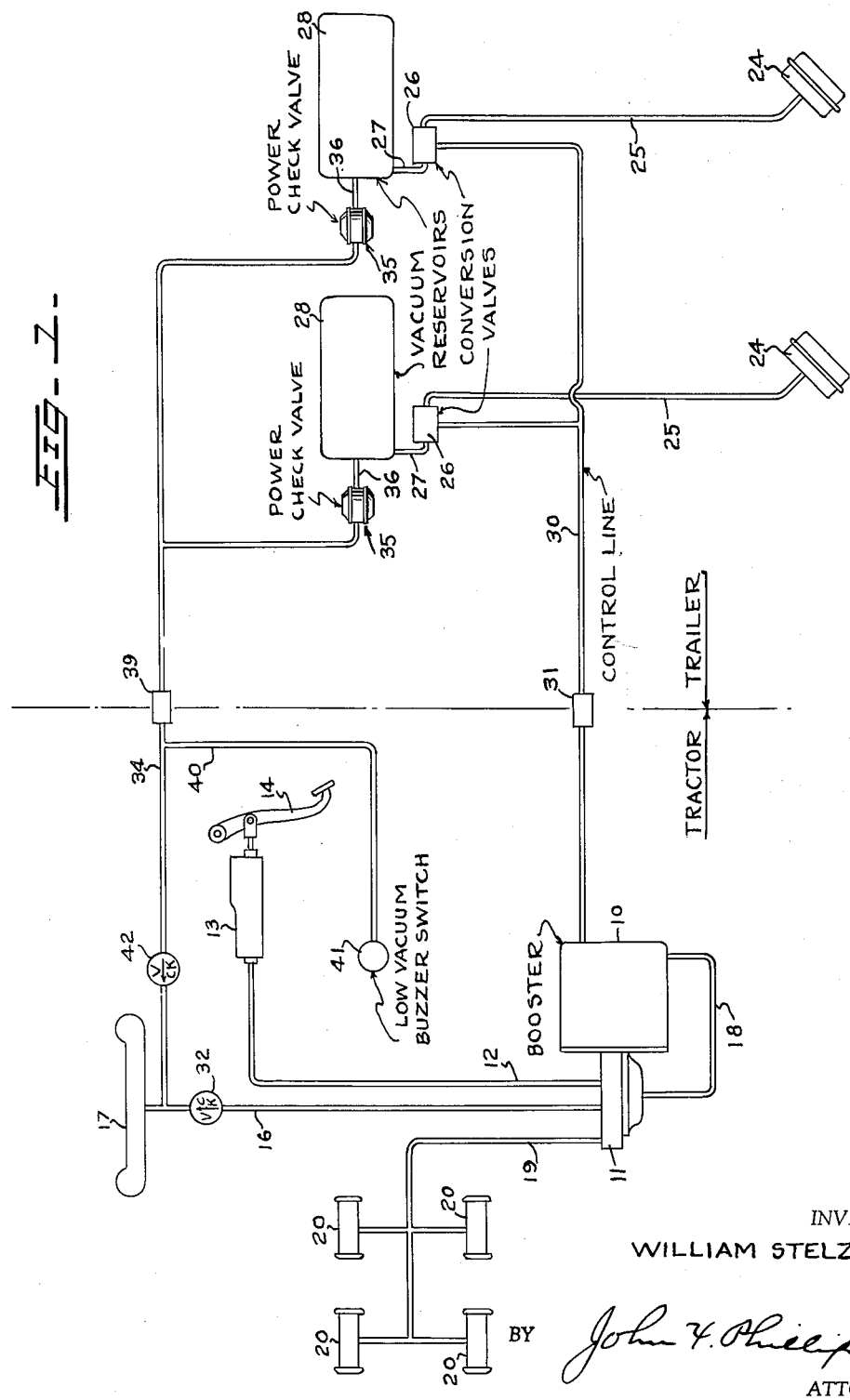
Figure 1 is a diagrammatic view of a tractor-trailer brake system showing two trailer vacuum reservoirs with each of which is associated the novel type of power check valve.

Referring to Figure 1, the numeral 10 designates any desired type of brake booster mechanism for the tractor having a valve mechanism generally indicated by the numeral 11 and not shown in detail. The booster is of the vacuum-suspended type and the valve mechanism therefor is adapted to be operated by fluid displaced through a hydraulic line 12 connected to a conventional master cylinder 13 operable by the usual foot pedal 14.

The valve mechanism is connected by a fluid line 16 to a source of vacuum 17 diagrammatically illustrated as the intake manifold of the motor vehicle engine. It will be apparent, however, that any desired source of vacuum may be employed, such as a vacuum pump. The end of the booster motor adjacent the valve mechanism is maintained in communication with the vacuum line 16. Pressure in the other end of the booster motor is controlled through a line 18 connected to the valve mechanism and normally connecting such end of the motor to the vacuum source to vacuum suspend the motor. It will be obvious that in accordance with conventional practice, operation of the brake pedal 14 will displace fluid through the line 12 to operate the valve mechanism, in which case the line 18 will be disconnected from the source of vacuum and air will be admitted thereto to raise pressure in the associated end of the booster 10 to operate the latter. Under such conditions, hydraulic fluid will be forced under pressure through lines 19 to the wheel cylinders 20 of the tractor.

The trailer is of the four-wheel type, and each set of trailer wheels is provided with a brake operated by an air-suspended motor 24. Only one of these motors has been shown for each set of trailer wheels. Each motor 24 is connected to a control line 25 leading to a conversion valve 26 having a line 27 connecting it to a vacuum reservoir 28. Two such reservoirs have been shown, one for the motors 24 of each trailer axle so that in the event of a failure of either set of trailer brakes the other will remain effective.

In accordance with conventional practice, the conversion valves are connected through a control line 30 with the end of the booster motor 10 to which air is admitted when the booster is operated. Since the motor 10 is vacuum-suspended, vacuum will normally be maintained in the line 30. When the booster 10 is operated, a rise in pressure effected therein through the line 18 will cause a corresponding rise in pressure in the control line 30, thus operating the conversion valves 26 to energize the trailer brake motors 24. The usual trailer connection 31 is provided in the control line 30, and a normally closed check valve 32 is arranged in the line 16.

The vacuum source 17 is connected by a branched supply line 34 with a pair of check valves 35, one of which is provided for each vacuum reservoir and connected thereto through a line 36. The check valves 35 form the principal feature of the present invention, and one of them is illustrated in various positions of the parts in Figures 2, 3 and 4. While two vacuum reservoirs and two power check valves 35 have been illustrated in Figure 1, it will become apparent that one vacuum reservoir may be employed for all of the trailer brakes, in which case a single conversion valve 26 will be used. It is preferred that the parts be duplicated as shown in Figure 1 in the interest of safety in trailer brake operation.

The supply line 34 is provided with the usual connection 39 forwardly of which a fluid line 40 is tapped into the supply line 34 and leads to a low vacuum buzzer switch 41 in the cab of the truck. Such switch is conventional and since it forms per se no part of the present invention, it need not be specifically illustrated. It will become apparent that any drop in vacuum in the line 34 below a predetermined point will result in operation of the switch 41 to warn the driver of loss of vacuum in the system. The line 34 is provided with a normally closed check valve 42.

Figure 2:
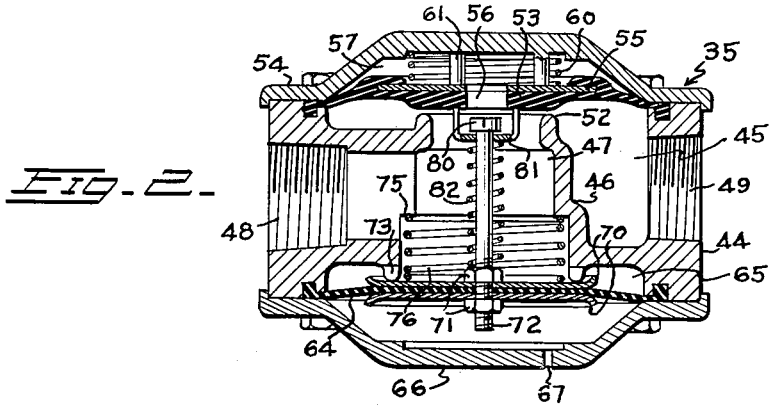
Figure 2 is an enlarged axial sectional view through one of the check valves showing the parts in the normal positions they will occupy when the system is functioning properly.
Figure 3:
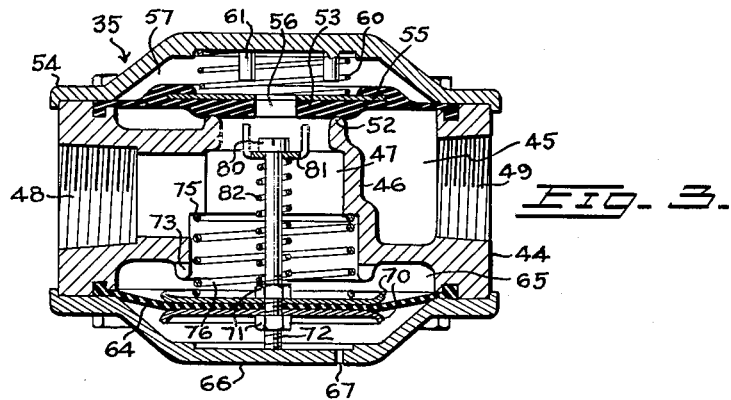
Figure 3 is a similar view showing the positions of the parts upon a substantial drop in vacuum ahead of the check valve.
Figure 4:
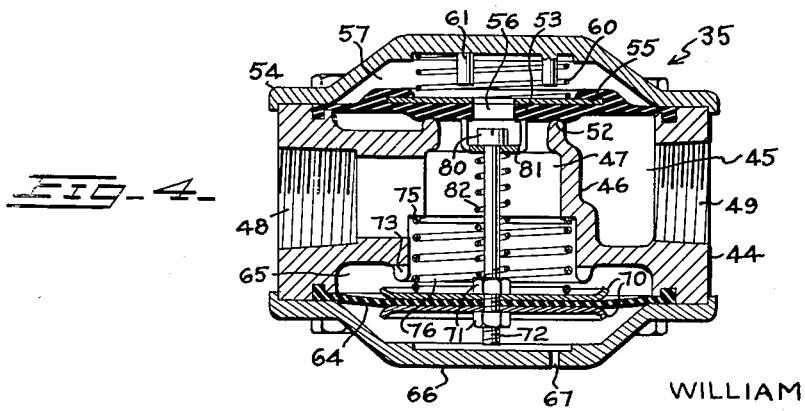
Figure 4 is a similar view showing the parts in the positions they will occupy with the valve closed at a drop in vacuum to the point at which the check valve is designed to close.

Referring to Figures 2, 3 and 4, one of the check valves 35 has been illustrated in detail and comprises a body 44 having a relatively large chamber 45 therein and centrally of such chamber is arranged a preferably integral cast wall 46 concentric with the valve body. This wall forms therein a chamber 47 communicating through a radial port 48 with the adjacent end of one of the branches of the supply line 34. The associated line 36 (Figure 1) communicates with the chamber 45 through a port 49. Except for the interposing therein of the radial port 48, the chamber 45 is annular, as will be obvious.

The upper end of the wall 46 is provided with a valve seat 52 normally engaged by a rubber or similar valve 53 formed as a diaphragm having its radially outer edge seated on the top of the body 44 and clamped in position by a closed cap 54. The check valve is provided with a stiffening plate 55, and this plate and the valve 53 are provided with a relatively large axial opening 56 therethrough affording communication between the chamber 47 and a chamber 57 formed in the cap 54.

The check valve 53 is urged downwardly by a spring 60 arranged in the chamber 57 and, in normal operation, the diaphragm plate 55 is in the upper position shown in Figure 2, engaging circumferentially spaced stop members 61 which may be formed integral with and project downwardly from the cap 54. It will be apparent that the diaphragm formed by the check valve 53 has its entire lower face exposed to the chambers 45 and 47 and its entire upper face exposed to the pressure in the chamber 47 through the opening 56.

The bottom of the body 44 is closed by a diaphragm 64 forming thereabove a chamber 65 communicating with and forming a part of the chamber 47. The diaphragm 64 is fixed in position by a lower cap 66 vented to the atmosphere as at 67.

The diaphragm 64 is clamped between a pair of plates 70 by nuts 71 carried by an axial stem 72. The upper plate 70, when the system is operating normally, will remain in engagement with depending stops 73 formed on the lower end of the wall 46.

The lower end of the chamber 47 is enlarged and provided with a shoulder 75. Between this shoulder and the upper plate 70 is arranged a spring 76 biasing the diaphragm 64 downwardly. This spring is overcome when vacuum is present in the chamber 47 above the predetermined point referred to below, with atmospheric pressure present in the cap 66. Under such conditions, the upper plate 70 will engage the stops 73.

The upper end of the stem 72 is provided with a head 80 below which is arranged the central portion of a yoke 81 slidable on the stem 72. The upwardly extending arms of this yoke are adapted to engage the check valve 53, under the conditions shown in Figure 2, to keep the check valve open against the tension of the spring 60. The yoke 81 is urged upwardly by a spring 82 seated at its lower end against the upper nut 71. When the vacuum in the chamber 47 is below a predetermined point, for example, if a break occurs in the supply line ahead of the check valve, the parts will occupy the positions shown in Figure 3, the spring 60 closing the check valve 53 and the spring 76 maintaining the diaphragm 64 in its lowermost position. When the vacuum in the chamber 47 is approximately at the point for which the check valve has been designed to cut off communication through the supply line, the parts will be arranged in the positions shown in Figure 4, as further described below.

*Operation*

When the system is functioning normally, the parts of each check valve 35 will be arranged as shown in Figure 2. Differential pressures acting on the diaphragm 64 will move this diaphragm upwardly to engage the upper plate 70 with the stops 73. Thus the spring 76 will be compressed and the stem 72 will be moved to its uppermost position. The spring 82 is stronger than the spring 60. Hence, when the stem 72 moves to its uppermost position, the head 80 is free of the yoke 81 and the arms of the yoke, under the influence of the spring 82, hold the check valve 53 in its open position shown in Figure 2. Thus, the check valve will be open to maintain communication between the associated vacuum reservoir and the source of vacuum.

Assuming that a rupture occurs in the supply line 34 ahead of the vacuum valve, air will rush into the chamber 47, thence upwardly through the large opening 56 into the chamber 57. Due to the exposure of the large upper area of the check valve to air pressure in the chamber 57, overbalancing pressures affecting the bottom of the check valve (the chamber 45 having vacuum therein), the check valve 53 will be instantly seated and air pressure in the chamber 57 of course will maintain it seated. This action takes place more rapidly than normally would occur by the raising of pressure above the diaphragm 64 followed by the action of the spring 76 to move the diaphragm 64 downwardly. In other words, the diaphragm 53 is power operated by air pressure, compressing spring 82 to seat valve 53 before the vacuum has dropped to a level where spring 76 moves stem 72 downwardly into the position shown in Figure 3. Of course, this spring 76 subsequently depresses stem 72 as the vacuum is further reduced in line 34 due to the breakaway. Accordingly, the chamber 47 will be completely cut off from the chamber 45 and the asociated reservoir will be maintained with full vacuum therein. The parts under such condition will occupy the positions shown in Figure 3. The stem 72 will be at its lower limit of movement with the lower end engaging the cap 66. The head 80 of the stem 72 will have been moved downwardly to engage the yoke and move the arms of the latter completely out of engagement with the check valve 53. Loss of vacuum in the supply line 34 under such conditions of course will operate the buzzer switch 41 to advise the driver of the loss of vacuum.

Assuming that a leak has occurred in the line 34 ahead of either valve 35 or that through some other cause such as improper functioning of the vacuum source, pressure should rise to a predetermined level in the line 34, the check valve 53 also will close. The valve structure is designed so that the check valve closes at any predetermined vacuum, for example, 12" of mercury. Assuming that the valve has been so designed and a pressure rise occurs in the supply line, such rise in pressure in the chamber 65 will reduce differential pressures affecting the diaphragm 64, thus permitting the spring 76 to become effective for moving the diaphragm 64 downwardly.

A gradual loss of vacuum in the line 34 will cause a similar rise in pressure in the chamber 47, and as this pressure gradually rises, the spring 76 will move the diapragm 64 downwardly together with the stem 72. After slight downward movement of this stem, the head 80 will engage the yoke 81 and further downward movement of the stem 72 will be accompanied by downward movement of the yoke 81 until the latter reaches the position shown in Figure 4. At such time, the check valve 53 will engage its seat 52, being moved downwardly by the spring 60. The increase in pressure in the supply line, therefore, will result in the closing of the check valve 53. The buzzer switch 41 is preferably designed to be operative at the pressure for which the check valve 35 is designed to operate. Accordingly, when the check valve 53 engages its seat 52, pressure in the supply line 34 will have risen to the point necessary to render the buzzer switch 41 operative to warn the driver of the loss of vacuum.

From the foregoing, it will be apparent that the use of the present check valve in a tractor-trailer system of the vacuum operated type embodies all of the advantages of both the normally open and the normally closed check valve. The check valve 53 is normally open when the system is functioning properly so as to maintain constant communication between the vacuum source and the vacuum reservoirs on the trailer. This is advantageous in preventing any misfunctioning of the conversion valves 26 which sometimes occurs with closed vacuum valves, resulting in a dragging of the trailer brakes. The vacuum valve 53, upon a sudden rupturing of the supply line 34, will instantly close to preserve the vacuum in the trailer reservoirs, the valve 53 serving under such conditions as a power check valve for the reasons given, the rush of air into the chamber 57 instantly closing the check valve. As distinguished from previously used normally open check valves in systems of this character, the check valve closes if the loss of vacuum in the supply line is gradual due, for example, to a slow leak in the line or the malfunctioning of the vacuum pump or other source of vacuum. The valve readily may be designed to close at any degree of vacuum in the chamber 47 when the loss of vacuum is gradual, and in actual practice it is preferred that the valve be designed to close at a vacuum of approximately 12" of mercury.

It will be noted that the check valves 32 and 42 are normally closed check valves of the type conventionally employed in tractor-trailer brake systems. The valves 35 are used in the system including the check valve 42 and do not disturb the normal functioning of such valve. When everything is operating properly, the valves 35 remain open as in Figure 2. Therefore, whenever pressure is lower to the left of the valve 42 than to the right thereof, this valve opens to lower the pressure in the system and maintain the proper vacuum in the reservoirs 28. The valve 42 functions to prevent the admission of air into the line 34 upon a failure in vacuum forwardly of the valve 42. Under such conditions, the valves 35 will be unaffected since vacuum is maintained in the line 34. However, upon the lowering of the vacuum in the supply line 34 below a predetermined point, the valves 35 close to maintain the previous vacuum charge in the reservoirs.

Assuming therefore that some fault occurs in the system forwardly of the check valve 42 this valve remains closed to prevent air from feeding into the line 34 and hence into the reservoirs. If a fault should occur in the line rearwardly of the check valve 42 a rise in pressure in the chambers 47 can only occur up to a predetermined point as explained above whereupon the valves 35 close to maintain the vacuum charge in the reservoirs.

It is to be understood that the form of the invention shown and described is to be taken as a preferred example of the same and that various changes in the shape, size and arrangement of the parts may be made as do not depart from the spirit of the invention or the scope of the appended claims.

I claim:

1. An emergency valve device comprising a housing having a first port for connection to a vacuum reservoir and a second port for connection to a vacuum line, said housing having a central axial chamber communicating with said second port and a surrounding chamber communicating with said first port, a valve seat in one end of said central chamber, a valve in the form of a diaphragm spanning said surrounding chamber and biased toward engagement with said seat to disconnect said chambers, a stem in said central chamber, an operating diaphragm at the other end of said central chamber closing the latter and connected to said stem, said operating diaphragm having one side open to said central chamber and its other side open to the atmosphere, a first spring between said housing and said operating diaphragm biasing said stem away from said valve, an operating element slidable on said stem adjacent said valve and having portions thereof engageable with said valve, means limiting movement of said operating element toward said valve relative to said stem, and a second spring surrounding said stem and having one end engaging said operating element and urging it toward its limit of movement, said housing including a cap mounted thereon and forming with said valve a third chamber at one side of said valve opposite said valve seat, said valve being provided with a relatively large axial opening therethrough concentric with and smaller than said valve seat and communicating with said third chamber.

2. An emergency valve device as set forth in claim 1 including a third spring weaker than said second spring and arranged in said third chamber and engaging at opposite ends against said cap and said valve.

3. An emergency valve device comprising a housing having a first port, a second port, and first and second chambers communicating respectively with said first and second ports, a valve seat between said chambers, a valve comprising a pressure responsive diaphragm adjacent one end of said second chamber, a first spring biasing said valve toward said seat, an operating diaphragm adjacent the other end of said second chamber exposed to pressure at one side in said chamber and at the other side to atmospheric pressure, a stem connected at one end to said operating diaphragm and having a stop element adjacent its other end, an operating element surrounding said stem adjacent said stop element and having portions within said seat engageable with said valve, a second spring surrounding said stem and engaging against said operating element to urge it toward said stop element and toward said valve, a third spring biasing said operating diaphragm in a direction away from said valve, and means normally maintaining vacuum to a predetermined degree in said second chamber to move said operating diaphragm against said third spring and disengage said stop element from said operating element whereby the latter is forced by said second spring against said valve to normally maintain it open, said valve device having a third chamber at the side of said valve opposite said seat, said valve having an opening therethrough of substantial size communicating at one end with said third chamber and at its other end with said second chamber wholly within said valve seat whereby a sudden substantial rise in pressure in said second chamber will be rapidly communicated to said third chamber to substantially balance pressures in said second and third chambers whereby said first spring will move said valve to closed position.

4. An emergency valve device comprising a housing having a first port and a second port, said housing having a first chamber communicating with said first port and a second chamber communicating with said second port, a valve seat between said chambers, a valve comprising a pressure responsive diaphragm engageable with said seat, means biasing said valve toward engagement with said seat, means for controlling the opening and closing of said valve in accordance with variations in pressure in said second chamber, such means comprising a stem in said second chamber and an element movable axially relative to said stem and engageable with said valve to open it, means biasing said stem for movement away from said valve, a portion of said stem engaging said element to move it away from said valve upon such movement of said stem, a pressure responsive device connected to said stem and subject on opposite sides to atmospheric pressure and to pressure in said second chamber, a spring connected between said pressure responsive device and said element, said pressure responsive device being operative when vacuum in said second chamber is above a predetermined value to move said pressure responsive device toward said valve whereby said spring will open said valve against the force biasing it toward said seat, there normally being vacuum in said second chamber above said predetermined value whereby said spring normally maintains said valve open whereby said pressure responsive diaphragm has one side normally open to pressures in both of said chambers, said valve device having a third chamber at the other side of said valve, said valve having an opening therethrough of substantial size communicating at one end with said third chamber and at its other end with said second chamber wholly within said valve seat whereby a sudden substantial rise in pressure in said second chamber will be rapidly communicated to said third chamber to substantially balance pressures in said second and third chambers whereby said valve will move to closed position.

5. A valve device according to claim 4 in which said pressure responsive device comprises a diaphragm sealing said second chamber at the end thereof opposite said valve, said last-named diaphragm having one side exposed to pressure in said second chamber and having its other side open to atmospheric pressure.

6. An emergency valve device comprising a housing having a first port and a second port, said housing having a first chamber communicating with said first port and a second chamber communicating with said second port, a valve seat between said chambers, a valve comprising a pressure responsive diaphragm engageable with said seat, means biasing said valve toward engagement with said seat, means for controlling the opening and closing of said valve in accordance with variations in pressure in said second chamber, such means comprising a stem in said second chamber and an element movable axially relative to said stem and engageable with said valve to open it, means biasing said stem for movement away from said valve, a portion of said stem engaging said element to move it away from said valve upon such movement of said stem, a pressure responsive device connected to said stem and subject on opposite sides to atmospheric pressure and to pressure in said second chamber, a spring connected between said pressure responsive device and said element, said pressure responsive device being operative when vacuum in said second chamber is above a predetermined value to move said pressure responsive device toward said valve whereby said spring will open said valve against the force biasing it toward said seat, means normally maintaining vacuum in said second chamber above said predetermined value whereby said spring normally maintains said valve open whereby said pressure responsive diaphragm has one side normally open to pressures in both of said chambers, said valve device having a third chamber at the other side of said valve, said valve having an opening therethrough of substantial size communicating at one end with said third chamber and at its other end with said second chamber wholly within said valve seat whereby a sudden substantial rise in pressure in said second chamber will be rapidly communicated to said third chamber to substantially balance pressures in said second and third chambers whereby said valve will move to closed position.

References Cited in the file of this patent

UNITED STATES PATENTS

| 1,267,809 | Shurtleff | May 28, 1918 |
|---|---|---|
| 1,507,073 | Lewis | Sept. 2, 1924 |
| 1,518,984 | Kien | Dec. 9, 1924 |
| 1,854,467 | Fourness | Apr. 19, 1932 |
| 2,006,319 | Hueber | June 25, 1935 |
| 2,571,885 | Ingres | Oct. 16, 1951 |
| 2,703,631 | Hupp | Mar. 8, 1955 |

FOREIGN PATENTS

| 487,908 | Great Britain | June 28, 1938 |
|---|---|---|
| 68,509 | Holland | Aug. 15, 1951 |
| 695,860 | Great Britain | May 27, 1952 |